(12) United States Patent
Von Puttkamer et al.

(10) Patent No.: US 9,039,336 B2
(45) Date of Patent: May 26, 2015

(54) MULTI-BLADE SOLID CARBIDE DRILL

(75) Inventors: Ingo Von Puttkamer, Messstetten (DE); Karl Trauner, Bingen (DE); Armin Helbig, Albstadt (DE)

(73) Assignee: Guehring OHG, Albstadt (DE)

( * ) Notice: Subject to any disclaimer, the term of this patent is extended or adjusted under 35 U.S.C. 154(b) by 544 days.

(21) Appl. No.: 12/946,365

(22) Filed: Nov. 15, 2010

(65) Prior Publication Data
US 2011/0170973 A1 Jul. 14, 2011

Related U.S. Application Data

(63) Continuation of application No. PCT/DE2009/000653, filed on May 12, 2009.

(30) Foreign Application Priority Data

May 16, 2008 (DE) .......................... 10 2008 023 856

(51) Int. Cl.
*B23B 51/02* (2006.01)
*B23P 15/32* (2006.01)
*B24B 19/04* (2006.01)

(52) U.S. Cl.
CPC ........... *B23B 51/02* (2013.01); *Y10T 408/9097* (2015.01); *Y10T 408/78* (2015.01); *B23B 2228/36* (2013.01); *B23B 2250/12* (2013.01); *B23B 2251/406* (2013.01); *B23P 15/32* (2013.01); *B24B 19/04* (2013.01)

(58) Field of Classification Search
CPC ................ B23B 51/02; B23B 2250/12; B23B 2251/406; Y10T 408/9097
USPC .................................. 408/224, 227, 229, 230
See application file for complete search history.

(56) References Cited

U.S. PATENT DOCUMENTS

| | | | | |
|---|---|---|---|---|
| 571,253 | A | * 11/1896 | Wesselmann | 408/223 |
| 750,537 | A | * 1/1904 | Hanson | 408/230 |
| 1,747,117 | A | * 2/1930 | Klein | 76/108.6 |
| 2,769,355 | A | * 11/1956 | Crisp | 408/230 |
| 4,222,690 | A | 9/1980 | Hosoi | |
| 4,381,162 | A | 4/1983 | Hosoi | |
| 4,744,705 | A | * 5/1988 | Imanaga | 408/230 |
| 5,622,462 | A | * 4/1997 | Gakhar et al. | 408/230 |
| 5,678,960 | A | 10/1997 | Just et al. | |
| 5,716,172 | A | * 2/1998 | Nakamura et al. | 408/230 |
| 6,071,046 | A | * 6/2000 | Hecht et al. | 408/225 |
| 6,602,029 | B1 | * 8/2003 | George | 408/230 |
| 6,916,139 | B2 | * 7/2005 | Yanagida et al. | 408/230 |
| 8,672,332 | B2 | * 3/2014 | Kauper | 279/20 |

(Continued)

FOREIGN PATENT DOCUMENTS

CA 1086995 10/1980
DE 2851183 6/1979

(Continued)

*Primary Examiner* — Eric A Gates
(74) *Attorney, Agent, or Firm* — Burr & Brown, PLLC

(57) ABSTRACT

The invention relates to a multi-blade solid carbide drill for cutting high-strength sandwich materials. The tool comprises a shaft section and an adjoining cutting part, into which a number of chip flutes that corresponds to the number of main blades is incorporated. In order to reinforce the curvature of the resulting chip, the chip flute of the drill comprises a chip flute rib in the region of the chip formation zone, said rib protruding from the chip flute surface and having a substantially wave-shaped cross-section (28), and said rib dividing the chip flute into two sections, a first chip flute section (30) forming the cutting rake and a second chip flute (32) forming the chip flute runout.

18 Claims, 4 Drawing Sheets

(56) References Cited

U.S. PATENT DOCUMENTS

| | | | |
|---|---|---|---|
| 2002/0159849 A1* | 10/2002 | Longden et al. | 408/199 |
| 2004/0067115 A1* | 4/2004 | Yamamoto | 408/230 |
| 2004/0101379 A1 | 5/2004 | Mabuchi et al. | |
| 2005/0053439 A1* | 3/2005 | Wang et al. | 408/230 |
| 2007/0237594 A1* | 10/2007 | Lang et al. | 408/230 |
| 2010/0092259 A1* | 4/2010 | Borschert et al. | 408/230 |
| 2011/0081215 A1* | 4/2011 | Nakamura et al. | 408/230 |

FOREIGN PATENT DOCUMENTS

| | | | | |
|---|---|---|---|---|
| DE | 3624617 | | 1/1988 | |
| DE | 3624617 A1 * | | 1/1988 | B23B 51/02 |
| EP | 1396303 | | 3/2004 | |
| EP | 1632301 | | 3/2006 | |
| GB | 2010142 | | 6/1979 | |
| JP | 59076709 A * | | 5/1984 | B23B 51/02 |
| JP | 01005708 A * | | 1/1989 | B23B 51/02 |
| JP | 02311211 A * | | 12/1990 | B23B 51/00 |
| JP | 03098709 A * | | 4/1991 | B23B 51/00 |
| JP | 03196908 A * | | 8/1991 | B23B 51/00 |
| JP | 07237018 A * | | 9/1995 | B23B 51/00 |
| JP | 2004167658 A * | | 6/2004 | B23B 51/00 |
| JP | 2004230514 A * | | 8/2004 | B23B 51/00 |
| JP | 2006110704 A * | | 4/2006 | |

* cited by examiner

MULTI-BLADE SOLID CARBIDE DRILL

The invention relates to a preferably multi-blade solid carbide (VHM) drill for cutting high-strength sandwich materials, in particular for drilling into a solid block of such materials, according to the preamble of claim 1.

In order to introduce highly precise drill-holes into sandwich materials, in particular composite materials, in which material layers with a predominant proportion of CFK and/or aluminium alternate with titanium layers or titanium-containing layers, particularly rigid and stable tools are required, which must also be characterised in that the blades are permanently capable of cutting the composite material with a good surface quality, wherein delamination of the composite layers should be avoided over the whole useful life of the tool.

For this purpose, special tools have been developed in the past, for example a tool such as is described in German utility model 20 211 592. Attempts have also already been made to perform cutting with solid carbide drills according to the preamble of claim 1, in order to ensure an improved useful life of the blades and—especially in the case of deep drill-holes—an improved positional precision of the drill-holes. This positional precision and surface quality of the drill-holes is required especially when cutting composite materials, which are finding increasing use in modern aircraft construction. The individual material layers, which may be arranged in the most varied sequence, endow the materials with a high stability whilst having a low weight. The drill-holes to be introduced into such materials are often required in order to rivet such components to one another. Since sensor-controlled robots are often used for this purpose, the positional precision of such drill-holes is of particular importance.

It has been shown that a sufficient stability of the tool and also qualitatively high-grade blades can indeed be made available with generic solid carbide drills. On the other hand, however, it has proved to be the case that even solid carbide tools of the standard design often do not achieve the required useful life, especially when relatively deep drill-holes have to be introduced into composite materials with alternating layers of aluminium, fibre-reinforced or carbon fibre-reinforced plastic and titanium.

The problem underlying the invention, therefore, is to develop a drill of the type described at the outset such that it is capable, whilst having an improved useful life, of also introducing in a problem-free manner position-precise drill-holes of greater depth in the critical materials described at the outset. A further aspect of the invention consists in making available an economical method for producing such tools.

With regard to the tool, this problem is solved by the features of claim 1 and, with regard to the method, by claim 9.

According to the invention, it was known that the useful life of the tool can be increased quite considerably if the chip in the flute base arising when drilling into a solid block has a particularly sharp curvature. It has been shown in protracted tests that this marked chip curvature, when cutting composite materials of the type described at the outset, leads to the chip breaking early, so that at the exit of the chip formation zone essentially discontinuous chips are present, which can easily be removed from the chip flute even when drill-holes with a great depth, for example greater than 10×D, are introduced into the material. Chip congestion, as was to be observed with conventional tools when cutting these materials difficult to machine, can be effectively avoided according to the invention, so that a sudden tool breakage is reliably eliminated. There is the additional advantage that the chip flute rib having a substantially wave-shaped cross-section and lying between the first and the second chip flute section leads to an increase in the geometrical moment of inertia of the drill cross-section and can thus be used to increase the stability of the tool. At the same time, however, this also means that the core cross-section of the drill in the chip formation zone can be further reduced, so that a large chip space can be made available despite the provided chip flute ribs. The removal of the chips can be further improved by the shortening the chip length, especially when the tool is provided with internal coolant/lubricant channels. The improvement in the cutting properties arises equally for straight-fluted and helical-fluted tools.

According to claim 9, however, the solid carbide drill can be produced economically, i.e. with an acceptable time expenditure. The first and second chip flute sections with the chip flute rib lying between the latter can either be ground to size into a carbide blank as part of series machining with two or more different profiled grinding wheels, or can be produced—this being the subject-matter of claim 10—by means of a single profiled grinding wheel. In this connection, it is also possible to extrude the carbide sintered blank with a mould which essentially corresponds to the cross-sectional shape of the cutting part in the state of use, taking account of a specific machining dimension which can vary in the millimeter range.

An advantageous embodiment of the method is the subject-matter of claim 11. With this method, it is possible to adapt the chip space of the drill to the involved area of use of the drill, for example to increase the chip space at the points at which the drill penetrates into the workpiece or is surrounded by a guide sleeve when the tool is used as a deep-hole drill.

Advantageous embodiments of the invention are the subject-matter of the sub-claims.

When the tool is provided with point thinning, the chip is lengthened towards the centre of the drill, so that the advantageous chip formation process described above and based on the design of the chip flute according to the invention can be extended to a larger cutting volume. Longer chips, which could lead to a chip congestion and ultimately to a forced breakage of the drill, can thus be advantageously and reliably prevented from occurring close to the centre of the drill.

It has been shown that, as a result of the modification of the drill profile, i.e. as a result of the reshaping of the chip flute in the region of the chip formation zone, a reduction in the core cross-section of the drill is also possible at least in this region. This reduction in the core cross-section is possible particularly because the tool is made of solid carbide. The small radii of curvature of the chip flute in the region of the first chip flute section necessarily resulting with the reduction in the core cross-section can be accepted even when machining extremely hard and tough materials, such as for example in the machining of titanium, since the carbide is readily capable of withstanding the increased abrasive forces due to the chip curvature. The useful life can of course be improved by the fact that the drill bit is provided with a suitable coating, for example a hard material coating, a soft material layer or a combined hard and soft layer.

Particularly good results can be achieved with extremely small radii of curvature of the first chip flute section according to claim 4, wherein the respective optimum smallest radius of curvature is selected depending on the material to be cut or on the employed quality of the solid carbide used for the tool, i.e. the physical parameters of the solid carbide.

As already mentioned at the outset, the design of the drill according to the invention leads to an extreme chip curvature and therefore to an early chip breakage, even when fracture-resistant and tough materials, such as for example titanium or composite materials with titanium layers, are machined. In principle, the cross-sectional shape, or the chip flute shape, can be retained over the whole length of the cutting part. A further improvement in the chip removal can however be achieved with the development of claim 4.

The effects according to the invention can be achieved when the special design of the drill cross-section is retained at least in the chip formation zone. However, it may be advisable—depending on the physical properties of the material to be cut—to retain this special cross-sectional design of the drill also beyond the chip formation zone over a predetermined axial length, i.e. up to a predetermined minimum distance from the drill bit, and only then to allow the chip flute rib to run out into a continuous chip flute. It has been shown that, in the case of high-strength sandwich materials, this minimum distance is set in the range between 2 and 5×D, preferably between 2 and 3×D The design of the drill according to the invention has particular advantages when the tool is provided with an internal coolant/lubricant supply and when, as the case may be, the cutting is carried out with a minimum quantity lubrication (MQL technology). In this case, the flow of coolant can be used effectively to improve the chip removal.

In workpieces of the type described at the outset, relatively deep holes with a drilling depth greater than 10×D (wherein D is the nominal diameter of the drill-hole) often have to be introduced. In this case, the drills are often additionally positioned by means of a guide bush at the workpiece. Especially when such an area of use of the tool is sought, it is advantageous to design the core cross-section of the drill according to claim 7. In this case, the chips acquire in the decisive zones an additional free space, through which they can be removed from the drill-hole effectively and quickly and above all without the risk of chip congestion, if need be assisted by the flow of coolant/lubricant, which has relatively high flow rates in the chip flute.

Advantageous developments are the subject-matter of the remaining sub-claims.

An example of embodiment of the invention is explained below in greater detail with the aid of schematic drawings. In the figures.

The tool represented in the figures is made from a solid carbide, and preferably from carbide with a fine grain. Carbide grades of this kind are sufficiently well known, so that there is no need for a more detailed description of the material. The decisive factor is that the carbide in the sintered state should exhibit a high degree of toughness and, on account of the fine-grain quality, offer the possibility of constituting stable and fine cutting edges.

Figure 5:
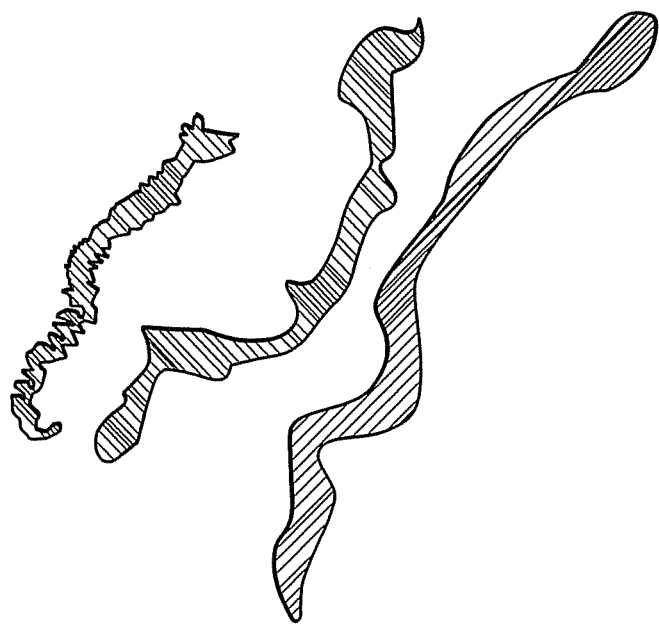
FIG. 5 shows a schematic representation of the chips, such as occur when drilling with conventional tools in workpieces difficult to cut.

The tool is used especially for cutting high-strength sandwich materials, and in particular for drilling solid blocks of such materials, which usually have a composite structure with alternating layers of carbon fibre-reinforced plastic (CFK), aluminium and titanium, wherein the sequence of the layers can vary depending on the intended use. When holes are introduced, in particular deep holes wherein the hole depth is a multiple of the nominal diameter of the drill-hole to be produced, these layers require extremely sharp cutting edges on the one hand, but also reliable removal of the occurring chips. Especially in the case of the high-strength sandwich composite materials described at the outset, which contain titanium-containing material layers, it has emerged with the use of conventional solid carbide tools that chips become congested in the chip flutes and so-called "concertina chips" arise, such as indicated for example in FIG. 5. Such chips can no longer be removed efficiently and completely from the chip flutes, especially when machining is taking place with very high coolant/lubricant pressures of an internal coolant/lubricant supply, such as employed with so-called minimum quantity lubrication (MQL technology). Finally, such chip congestion leads to early forced breakage of the drill, which is associated with considerable commercial consequences.

In contrast, the drill according to the invention has a novel structure which is described below.

The tool denoted by reference number 10 with internal cooling channels 40 has a shaft section 12 and an adjacent cutting part 14, into which a number of chip flutes 18 are incorporated, said number corresponding to the number of main cutting edges 16. Since the tool is made from solid carbide, these flutes 18 are usually ground into a cylindrical solid carbide blank, which is often provided with internal cooling channels. The drill bit, which is represented in perspective on an enlarged scale in FIG. 2, has conventional point grinding with main flanks 20 and a transverse cutting edge 22. The point grinding itself, i.e. the formation of the main flanks, can be provided and formed according to any standard methods, so that a more detailed description of the geometry of these flanks is not necessary here.

With the example of embodiment of the tool shown, transverse cutting edge 22 is shortened by the grinding-in of a point thinning 24. In the embodiment shown according to FIG. 2, a point thinning according to DIN 1412 Form A is represented. It is however equally possible to provide other forms of point thinning, for example forms of point thinning with which a correction of main cutting edge 16 is carried out at the same time.

Figure 1:
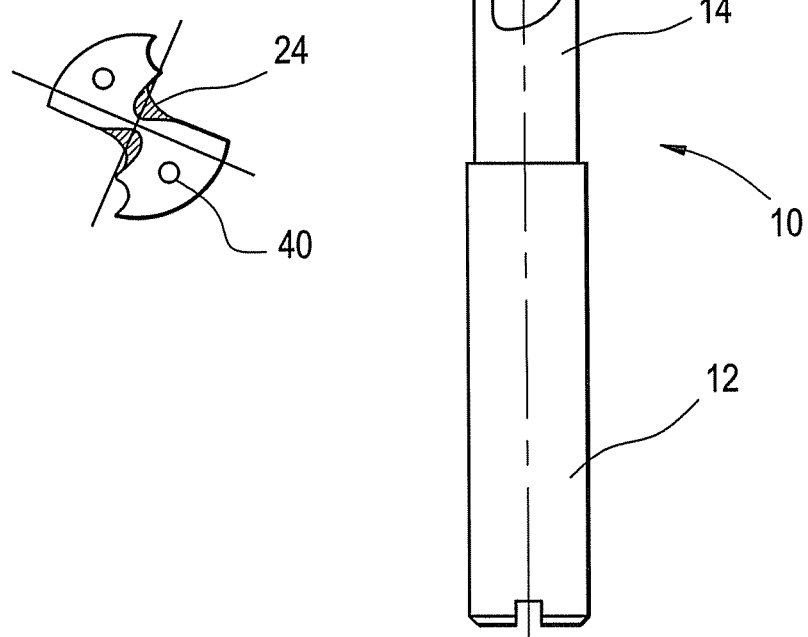
FIG. 1 shows a schematic side view of a drill according to the invention.
Figure 1A:
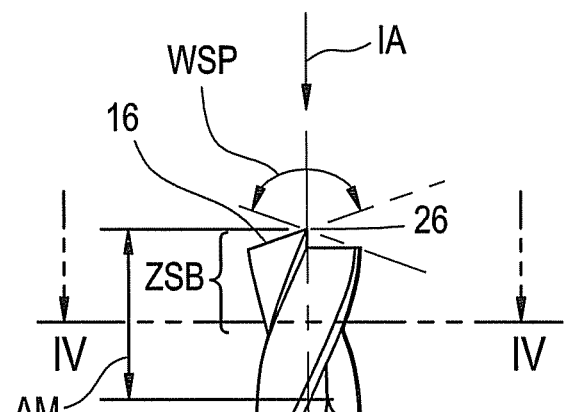
FIG. 1A shows, in an enlarged representation, the plan view of the drill according to FIG. 1 with a viewing direction "IA" according to FIG. 1.
Figure 2:
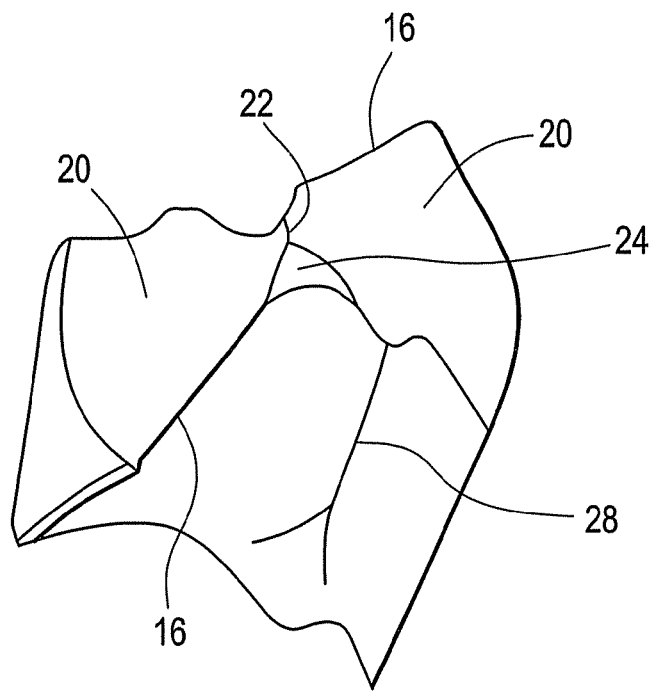
FIG. 2 shows, in an enlarged representation, a perspective oblique view of the bit of the drill according to FIG. 1.

The distinctive feature of the tool represented in the figures consists in the fact that a special design of the drill cross-section is provided in the region of the chip formation zone represented in FIG. 2, i.e. in the region in which a continuous chip arises on the main cutting edge and slides off on the chip flute. The chip formation zone can vary, depending on the material to be cut and the run of the main cutting edge, in particular on the selection of the point angle WSP enclosed by main cutting edges 16 of the drill (see FIG. 1). As a rule, the chip formation is terminated at a distance AM from drill bit 26, wherein dimension AM lies between 2 and 5×D, when D denotes the nominal diameter of the drill.

Figure 4:
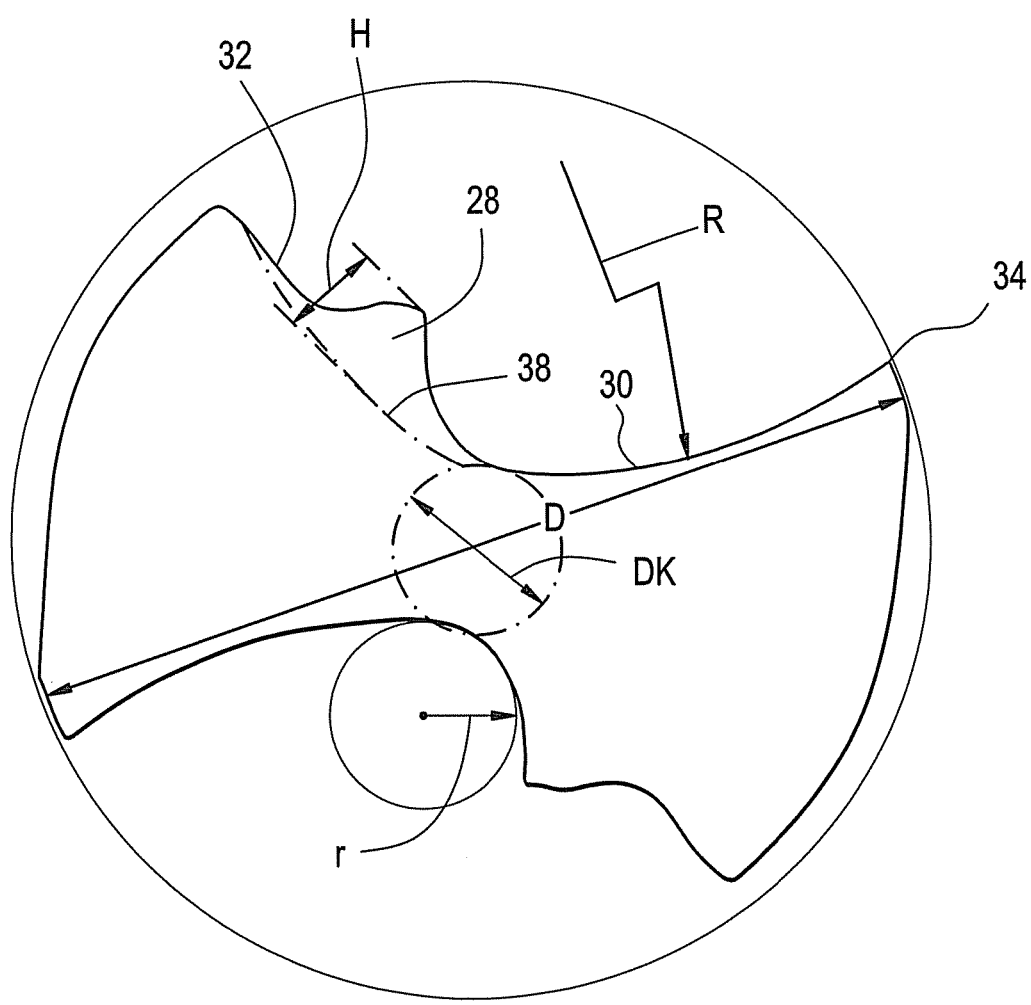
FIG. 4 shows, on a very enlarged scale, the cross-section of the drill in the region of the chip formation zone, i.e. in the region of a cross-sectional plane close to the drill bit, for example in the case of a cutting path according to IV-IV in FIG. 1.

In this chip formation zone, the drill has a cross-section such as is represented on an enlarged scale in FIG. 4. It can be seen that in this region the drill has a chip flute divided into two sections. A chip flute rib 28 having a substantially wave-shaped cross-section protrudes from an otherwise continuous chip flute surface indicated at the top of FIG. 4 by a dot-dashed line. This chip flute rib therefore divides the chip flute in this region into two sections, i.e. a first chip flute section 30 forming the cutting rake and a second chip flute section 32 forming the chip flute runout. The height of chip flute rib 28 denoted by H is governed according to the curvature of first chip flute section 30 and it preferably lies in the range between 0.05 and 0.15×D, wherein the core cross-section of the drill in the region of the chip formation zone enters as an additional parameter for the selection of dimension H. This diameter is denoted in FIG. 4 by reference symbol DK and it lies in the range between 0.15 and 0.25×D, preferably between 0.16 and 0.2×D.

It can be seen from the representation according to FIG. 4 that, viewed in cross-section, radius of curvature R of first chip flute section 30 constantly diminishes with increasing distance from cutting edge corner 34, until it forms smallest radius of curvature r in the flute base before chip flute rib 28. This smallest radius of curvature r preferably lies in the range between 0.15 and 0.25×D, preferably between 0.18 and 0.22×D, the dimension again denoting the nominal diameter of the drill.

With the structure of the multi-blade solid carbide drill described above, the following effect arises during cutting, which will be explained in greater detail with the aid of FIG. 3. The chip arising at main cutting edge 16 is denoted by reference number 36 in FIG. 3.

Figure 3:
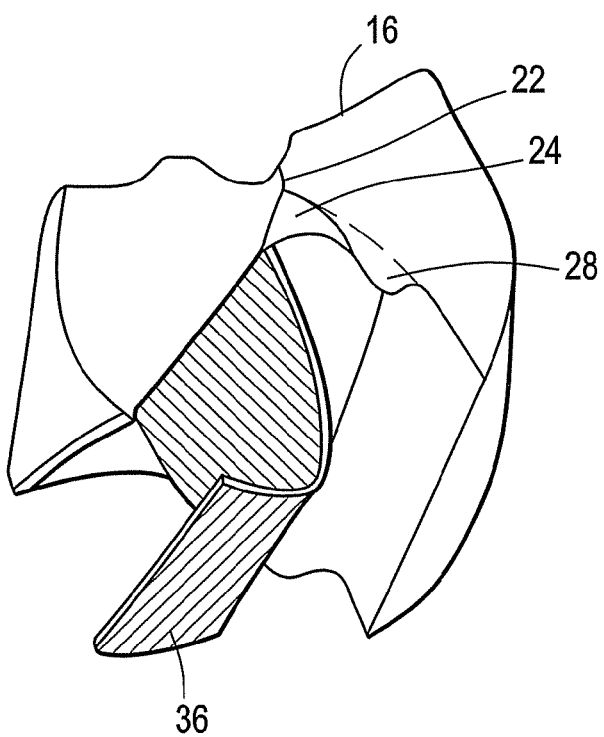
FIG. 3 shows, in a view corresponding to FIG. 2, the representation of the emergence of the chip when the tool according to FIGS. 1 and 2 penetrates into the workpiece.
Figure 6:
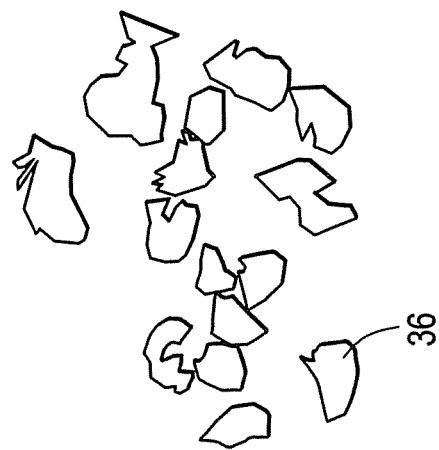
FIG. 6 shows a schematic representation of the drilling chips, such as can be achieved with the design of the drill according to the invention.

In the schematic representation according to FIG. 3, the width of the chip corresponds to the length of main cutting edge 16. It should however be emphasised that the chip can—depending on the formation of point thinning 24—also reach up to shortest transverse cutting edge 22. The decisive factor is that, due to the special design of first chip flute section 30, i.e. due to the provision of chip flute rib 28 with a wave-shaped cross-section, arising chip 36 acquires a greatly increased curvature which leads to an early chip breakage, i.e. to the generation of so-called discontinuous chips, which are represented schematically in FIG. 6. This chip breakage occurs even when extremely robust and rigid materials are cut, such as titanium for example, which occurs for example in a composite structure of aircraft sandwich materials.

The chip pressure acting from chip 36 on chip flute rib 28 is of course greater in the case of the design of the drill according to the invention. As a result of the selection of the material, i.e. due to the fact that the tool produced from solid carbide, this increased loading on the material can be readily taken up. The drill is provided in this region with a suitable coating if necessary, such as is known in many cases in the prior art. In this connection, reference is made for example to coatings which are described in detail for example in the applicant's tool catalogue (Gühring—Wer Bietet Mehr?: "The Tool Company", issue in German 2006, price list no. 40). Such coatings serve to reduce the friction and/or to reduce wear. Use may be made of a carbide layer, such as for example a layer of diamond, preferably nano-crystalline diamond, of TiN or of (Ti, Al)N or also a multi-ply layer. A combination of a hard metal layer and a soft layer can also be used, as required and depending on the material to be cut. The layer is also governed according to the kind of carbide used in each case and can be selected by the person skilled in the art by consulting the published catalogue.

Chip flute rib 28 is no longer required from a minimum distance AM from drill bit 26. In this region (see FIG. 1 and FIG. 2), chip flute rib 28 gradually runs out into flute base 38, which has already been indicated in FIG. 4 with a dot-dashed line. The core cross-section in the region of the chip flute outside the chip formation zone can be kept unchanged, or can even become smaller in order to improve the removal of chips 36, which can be assisted in particular by the coolant/lubricant fed through the internal cooling channels, especially when use is made of MQL technology. Especially when the tool is used for the introduction of deep holes with a drilling depth greater than 10×D, it may be advantageous to increase the chip flute depth in the regions in which the tool penetrates into the material. This increase in the chip flute depth can be extended to the region which, when use is made of the tool as a deep-hole drill, remains guided in a guide bush outside the workpiece. In order to increase the stability of the tool, the chip flute depth can increase gradually or abruptly outside these regions enclosed by spaces.

For the production of the drill described above, it is advantageous to proceed in such a way that the chip flute profile shown in FIG. 4 is either ground throughout with a single form-grinding wheel or such that a plurality of form-grinding wheels are used, the latter being used one after the other to form the profile shown in FIG. 4. Chip flute rib 28 can then be ground away in the region outside the region denoted by dimension AM in FIG. 1. It is also conceivable to extrude the chip flute profile according to FIG. 4 with a suitable excess amount together with the solid carbide blank in order to save material and to minimise the cutting volume.

Departures from the described example of embodiment are of course conceivable without going beyond the scope of the invention.

Thus, for example, the solid carbide drill can be constituted in a multi-part version, wherein a solid carbide part with the above-described structure forming the drill bit is placed onto another part, which is made from another material.

The tool can also be provided with internal cooling channels. Straight flutes can also be used instead of the helical chip flutes shown in the embodiments.

The tool can also be designed with more than two cutting edges, wherein each chip flute then comprises a chip flute rib described above in the region of a chip formation zone.

The invention thus creates a multi-blade solid carbide. (VHM) drill for cutting high-strength sandwich materials. The tool has a shaft section and an adjacent cutting part, into which a number of chip flutes corresponding to the number of main cutting edges are incorporated. In order to increase the curvature of the occurring chips, the chip flute of the drill has in the region of a chip formation zone a chip flute rib protruding out of the chip flute surface and having a substantially wave-shaped cross-section, said chip flute rib dividing the chip flute into two sections, a first chip flute section forming the cutting rake and a second chip flute section forming the chip flute runout.

The invention claimed is:
1. A solid carbide drill comprising:
a shaft section;
an adjacent cutting part; and
a drill bit,
said cutting part comprising a core, a number of main cutting edges and a number of chip flutes,
said number of chip flutes corresponding to said number of main cutting edges,
at least a first chip flute of the drill comprising a chip flute base and a chip flute rib, said chip flute rib protruding out of the chip flute base in a chip formation zone of said drill, said chip flute rib having a substantially wave-shaped cross-section, said chip flute rib dividing the chip flute in the chip formation zone into a first chip flute section forming a cutting rake and a second chip flute section forming a chip flute runout, the first chip flute section comprising a cutting edge corner at a radial periphery of the first chip flute section, the first chip flute section extending from the cutting edge corner to the chip flute rib, the chip flute rib located beyond the core, the second chip flute section comprising at least one convex area, said chip formation zone and said chip flute rib terminating at a chip formation zone termination location, said chip flute terminating at a chip flute termination location, a distance between said drill bit and said chip formation zone termination location shorter than a distance between said drill bit and said chip flute termination location.

2. The drill according to claim 1, wherein the drill bit comprises a point thinning.

3. The drill according to claim 1, wherein a core cross-section of the drill in the chip formation zone lies in the range between 0.15×D and 0.25×D, wherein D is a nominal diameter of the drill.

4. The drill according to claim 3, wherein a core cross-section of the drill at least in the chip formation zone is in a range of from 0.16×D to 0.20×D.

5. The drill according to claim 1, wherein, viewed in cross-section, a smallest radius of curvature of the first chip flute section before the chip flute rib lies in the range between 0.15×D and 0.25×D, wherein D is a nominal diameter of the drill.

6. The drill according to claim 5, wherein, viewed in cross-section, a smallest radius of curvature of the first chip flute section before the chip flute rib is in a range of from 0.18×D to 0.22×D.

7. The drill according to claim 1, wherein the chip flute rib gradually runs out into the flute base at the chip formation zone termination location.

8. The drill according to claim 1, wherein the distance between the drill bit and the chip formation zone termination location is in the range of from 2×D to 5×D, wherein D is a nominal diameter of the drill.

9. The drill according to claim 1, wherein, when the drill is used for drilling deep drill-holes, a core cross-section of the drill following the chip formation zone is further reduced in the region which, during drilling, remains covered either by a drill-hole wall or a guide bush.

10. The drill according to claim 1, wherein, viewed in cross-section, a radius of curvature of the first chip flute section constantly diminishes with increasing distance from a cutting edge corner.

11. The drill according to claim 1, wherein the distance between the drill bit and the chip formation zone termination location is in a range of from 2×D to 3×D.

12. The drill according to claim 1, wherein the drill bit is provided with point grinding.

13. The drill according to claim 1, wherein the second chip flute section comprises a concave area at a greater radial position than the convex area.

14. The drill according to claim 1, wherein the convex area is between a first concave area and a second concave area, the first concave area in the first chip flute section and the second concave area in the second chip flute section.

15. A drill comprising:
a shaft section;
an adjacent cutting part; and
a drill bit,
said cutting part comprising a number of main cutting edges and a number of chip flutes,
said number of chip flutes corresponding to said number of main cutting edges,
at least a first chip flute of the drill comprising a chip flute base and a chip flute rib, said chip flute rib protruding out of the chip flute base in a chip formation zone of said drill, said chip flute rib having a substantially wave-shaped cross-section, said chip flute rib dividing the chip flute in the chip formation zone into a first chip flute section forming a cutting rake and a second chip flute section forming a chip flute runout,
viewed in a planar cross-section of the chip formation zone perpendicular to an axis of the drill, a curvature of at least a portion of said first chip flute section in an area adjacent to said chip flute rib is concave, and a curvature of at least a portion of said second chip flute section in an area immediately adjacent to said chip flute rib is convex,
the second chip flute section having a concave area, the convex area of the second chip flute section between the concave area of the first chip flute section and the concave area of the second chip flute section.

16. The drill according to claim 15, wherein the drill further comprises a core, and the first chip flute section comprises a cutting edge corner at a radial periphery of the first chip flute section, the first chip flute section extending from the cutting edge corner to the chip flute rib, the chip flute rib located beyond the core.

17. The drill according to claim 15, wherein the first chip flute section is deeper toward an axis of the drill than the second chip flute section.

18. The drill according to claim 15, wherein the first chip flute section comprises a cutting edge corner at a radial periphery of the first chip flute section, and wherein a radius of curvature of the first chip flute section diminishes with increasing distance from the cutting edge corner until it forms a smallest radius of curvature in the chip flute base before the chip flute rib.

* * * * *